United States Patent Office 3,554,951
Patented Jan. 12, 1971

3,554,951
POLYESTER POLYURETHANE LACQUERS FROM MIXED PHTHALIC ACIDS
Friedrich Blomeyer, Cologne-Stammheim, Wilhelm Bunge, Leverkusen, Gerhard Mennicken, Opladen, and Reinhard Hebermehl, Leverkusen, Germany, assignors to Farbenfabriken Bayer Aktiengesellschaft, Leverkusen, Germany, a corporation of Germany
No Drawing. Continuation of application Ser. No. 535,025, Mar. 17, 1966. This application Mar. 26, 1969, Ser. No. 812,958
Claims priority, application Germany, Mar. 17, 1965, F 45,546
Int. Cl. C08g 22/06, 22/10, 51/26
U.S. Cl. 260—29.1                                   7 Claims

ABSTRACT OF THE DISCLOSURE

Polyurethane lacquer composition which comprises a solvent solution of a polymer prepared by reacting an aliphatic polyisocyanate with an hydroxyl polyester of an excess of a polyhydric alcohol with a mixture of phthalic acid and hexahydrophthalic acid.

---

This application is a continuation of application Ser. No. 535,025, filed Mar. 17, 1966, now abandoned.

This invention relates to polyesters and polyurethane plastics based on polyesters. More particularly the invention relates to polyester compositions that have improved properties, particularly for the production of certain types of polyurethanes.

It has been proposed heretofore to prepare polyurethanes from polyesters which are based on phthalic acid and a polyhydric alcohol. It has been also proposed heretofore to prepare polyurethane plastics which are based on aliphatic polyisocyanates. The polyurethane plastics based on aliphatic polyisocyanates, particularly hexamethylene diisocyanate and its urea or biuret derivatives, and polyesters based on phthalic acid retain their gloss and color tone even under adverse conditions. The best stabilization of color tone and gloss are obtained if certain polyesters based on phthalic acid and trimethylolpropane are reacted with a biuret isocyanate of the type disclosed in U.S. Pat. 3,201,372. When a polyester, for example one prepared from phthalic acid and trimethylolpropane, having a hydroxyl number of 225 to 270, is reacted with a biuret triisocyanate, films are obtained which do not show any loss of gloss or any change in color tone after being exposed for four years to salt water, high altitude climates or industrial atmospheres. Furthermore, these polyester coatings have excellent resistance to synthetic tests. For example, they show no loss of gloss after 2000 hours in the weatherometer. This excellent resistance to weathering and exposure to the elements have not been obtained herefore using any other polyhydroxyl compound, even in conjunction with the biuret triisocyanate. It has been found, however, that the polyesters based on phthalic acid alone or indeed in a mixture with other acids such a maleic acid and the like exhibit unsatisfactory compatability with additives and unsatisfactory solubility in solvents which must be used in order to deposit polyurethane coating compositions onto substrates. Due to this incompatibility gel particles form prematurely and it is practically impossible to deposit a perfectly smooth coating on a steel substrate, for example. Furthermore, the polyesters which give these highly advantageous properties are incompatible with many of the usual additives such as flow improvement agents, thickeners and the like, which are customarily employed in the preparation of coating compositions. Since the polyester has limited solubility in the solvents and limited compatibility with the flow improving agents and thickeners based on cellulose, polyesters or hydrogenated castor oils their use, for example, for automotive coatings and the like has heretofore been impractical. Another disadvantage of the heretofore known coatings based on phthalic acid and even mixtures of phthalic acid with other acids is that the polyester has only limited solubility with aromatic solvents such as toluene and xylene.

It has been proposed heretofore to prepare polyurethane plastics based on polyesters from hexahydroterephthalic acid alone. These polyesters result in films which have inadequate resistance to solvents.

It is, therefore, an object of this invention to provide polyurethanes and polyesters for the preparation of polyurethanes which have improved compatibility with other components in polyurethane formulations and improved solubility in solvents, particularly aromatic solvents, which are used in order to apply a film to a substrate. Another object of this invention is to provide particular mixtures of acids which are advantageous for the preparation of improved polyesters and particularly improved polyurethane plastics based on said polyesters which are deposited on a substrate by evaporation of a solvent. A further object of this invention is to provide polyurethane plastics, particularly coatings which are more uniform, free of lumps and surface defects and which are stable against the influence of additives, particularly those based on cellulose, hydrogenated castor oil, polyesters and the like. Still another object of this invention is to provide polyesters and polyurethanes coating compositions based on those polyesters which have improved solubility in solvents used for the production of coating compositions and particularly aromatic solvents. A further object of this invention is to provide for the preparation of polyesters and to provide for the preparation of polyurethanes based on the polyesters which have improved properties.

The foregoing objects and others which will become apparent from the following description are accomplished in accordance with the invention, generally speaking, by providing hydroxyl polyesters which are based on a mixture of phthalic acid and a hexahydrophthalic acid reacted with an excess of polyhydric alcohol and polyurethanes prepared by reacting said polyesters with an organic polyisocyanate. The invention contemplates polyurethane coating compositions based on organic polyisocyanates of many types, however, where the polyester is to be employed in the production of a coating composition which is to have improved gloss and improved compatibility with the other compounds, it is preferred to use an aliphatic polyisocyanate, most preferably one which contains additional urea, biuret or isocyanurate groups.

The polyesters of the invention are prepared by reacting a mixture of phthalic acid and a hexahydrophthalic acid in proportions of from about 0.5 to about 2.5 mols of phthalic acid to about 2.5 to 0.5 mols of hexahydrophthalic acid. The compatability of the polyesters with the additives and solvents used in the preparation of polyurethane films is increased with increasing contents of a hexahydrophthalic acid, but too much will result in poor resistance to solvents. Polyesters based on proportions of phthalic acid and a hexahydrophthalic acid in the range of 2:1 to 1:2 (molar) and an excess of polyhydric alcohol based on carboxylic acid groups or mixtures of acid is especially advantageous with regard to compatibility. While the invention is particular to phthalic acid, i.e. benzene-1,2-dicarboxylic acid, it is possible to mix in isophthalic acid, i.e. benzene-1,3-dicarboxylic acid, in place of a portion of the phthalic acid. Good solubility combined with good compatibility with polymers and copolymers is obtained if, for example, the ratio of phthalic acid to isophthalic acid to hexahydrophthalic acid is 1:1:1.

Any suitable hexahydrophthalic acid may be used such as lower alkyl hexahydrophthalic acid such as, for example:

1-methylcyclohexane-2,3-dicarboxylic acid,
1-ethylcyclohexane-2,3-dicarboxylic acid,
1-propylcyclohexane-2,3-dicarboxylic acid,
1-butylcyclohexane-2,3-dicarboxylic acid, as well as
1-methylcyclohexane-3,4-dicarboxylic acid,
1-ethylcyclohexane-3,4-dicarboxylic acid,
1-propylcyclohexane-3,4-dicarboxylic acid,
1-butylcyclohexane-3,4-dicarboxylic acid,
endomethylene hexahydrophthalic acid, i.e.

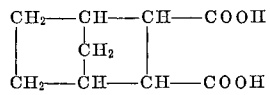

and the like. The term "phthalic" without modification refers throughout to the ortho acids and not to meta or para acids. Furthermore, both the cis and trans isomers are contemplated, where appropriate. The acids are prepared, for example by hydrogenation of the corresponding aromatic acids or they can be prepared by the Diels-Alder condensation, for example of maleic anhydride and butadiene, isoprene or cyclopentadiene with simultaneous hydrogenation.

Any suitable alcohol may be used for the preparation of the polyester of the invention, but it is preferred to use diols or triols. Suitable polyhydric alcohols include the lower alkylene glycols having the formula HO $(C_nH_{2n}O)$ H where $n$ is from 2 to 10, such as for example, ethylene glycol, 1,2-propylene glycol, 1,3-propylene glycol, 1,4-butane diol, 1,3-butane diol, 2,3-butane diol, pentaglycol, 1,6-hexanediol, 2,3-hexanediol, 1,7-heptanediol, 1,8-octane diol, 1,9-nonane diol. Suitable triols include, for example, glycerine, trimethylol propane, 1,3,6-hexane triol and the like. The polyhydric alcohols preferably have a molecular weight below about 500.

The polyesters are prepared, for example by mixing the acids with the polyhydric alcohol and gradually heated, preferably in an inert atmosphere of nitrogen, argon and the like, preferably to 200 to 220° C. depending on the rate at which water is split off. The reaction is preferably first carried out at atmospheric pressure and subsequently under a partial vacuum to aid in removing the water of condensation. If desired, the esterification may be carried out with the use of a carrier or in the presence of an esterification catalyst such as sodium, potassium, lithium, calcium, magnesium, zinc, cadmium, manganese, iron, cobalt, nickel, tin, lead and bismuth as well as the carbonates, oxides and alcoholates of alkaline and alkaline earth metals either alone or in combination, zinc chloride, aluminum chloride, antimony chloride, antimony fluoride, boron fluoride, the oxides, chlorides, sulfates, acetates, alcoholates and salts of higher aliphatic or aromatic monocarboxylic acids of the elements of the third, fourth and second sub-group of the periodic system, alkaline and/or alkaline earth metal salts of silicic acid, stannic acid, selenic acid, phosphoric acid and tungstic acid or the like. Especially valuable catalysts are manganese phosphate, mixtures or manganese phosphate and antimony oxide, or mixtures of manganese phosphate, antimony oxide and zinc acetate. The proportion of the mixture of acids to alcohol should be such that there will be an excess of hydroxyl groups present so that hydroxyl polyesters are obtained.

The polyester of the invention can be reacted with an organic polyisocyanate to prepare polyurethane plastics particularly films which are deposited from a solvent and which have improved high gloss and resistance to weathering. Moreover the color tone of the polyurethane plastics of the invention are improved by the use of the polyhydric polyesters disclosed above. One of the most important advantages of the invention is that the polyesters do not form gel particles which show up in the coatings as rough places on the surface.

Any suitable organic polyisocyanate may be used for the preparation of the polyisocyanate plastics of the invention. It is preferred, however, to use aliphatic polyisocyanates such as hexamethylene diisocyanate, ethylene diisocyanate, trimethylene diisocyanate, tetramethylene diisocyanate, decamethylene diisocyanate, 1,4-cyclohexane diisocyanate, 1-methyl-2,4-diisocyanato cyclohexane, 1-methyl - 2,6-diisocyanato cyclohexane and mixtures thereof. In addition it is often preferred to use isocyanates which are based on reaction products of the monomeric isocyanates with other components in order to increase their molecular weight and functionality. For example, organic isocyanates which contain urea, biuret, isocyanurate or acyl groups are particularly advantageous for the preparation of improved coatings in accordance with the present invention. Biuret polyisocyanates of this type are disclosed, for example in U.S. Pat. 3,201,372, particularly N,N',N''-tris-(isocyanatohexyl)-biuret, N,N',N''-tris-(isocyanatobutyl)-biuret, N,N',N''-tris-(isocyanatobutyl diisocyanatophenyl)-biuret, N,N',N''-tris-(4-isocyanatocyclohexyl)-biuret, N,N',N''-tris-(isocyanatobenzyl)-biuret, N,N',N''-tris(betaisocyanatoethyl benzene)-biuret, N-4-isocyanatophenyl - N',N''-di-(isocyanatobutyl)-biuret as well as higher biuret polyisocyanates which may be represented by the formulas:

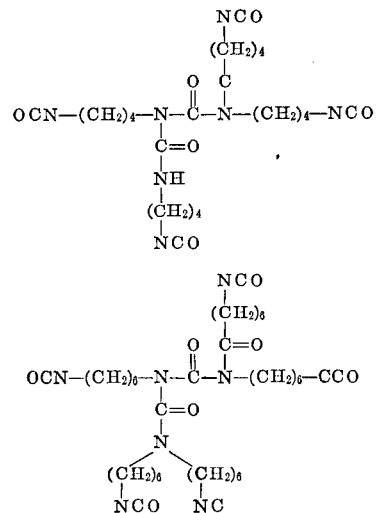

and the like. Examples of isocyanaurate polyisocyanates of those obtained, for example by trimerizing hexamethylene diisocyanate, tetramethylene diisocyanate, xylylene-1,4- or 1,3-diisocyanate either alone or with additional isocyanates including toluylene-2,4-diisocyanate and the like, in the presence of a suitable trimerization catalyst such as trialkylphosphine, for example, trimethylphosphine, triethylphosphine, tribenzylphosphine and the like. It is also possible to use isocyanates which contain acyl groups, for example isocyanates obtained by reacting an aliphatic diisocyanate with an aliphatic dicarboxylic acid. Any of the aliphatic diisocynates referred to above may be reacted with any suitable dicarboxylic acid, such as adipic acid, methyl adipic acid, glutaric acid, methyl glutaric acid, phthalic acid, hexahydrophthalic acid and the like. There must be at least four mols of organic diisocyanate present per mol of dicarboxylic acid.

In comparison with the heretofore known phthalic acid polyesters the polyesters of this invention have outstanding solubility in solvents and outstanding compatibility with the usual additives used in the preparation of polyurethane lacquers. Solutions of the polyisocyanates, even where there are high portions of aromatic solvents such as xylene or toluene can be prepared. The preferred solvents contain less than 60 percent by weight aromatic solvents and most preferably less than 50 percent aromatic solvents. Suitable solvents and mixtures of solvents are shown in Table I. Furthermore, the polyesters of the invention are compatible with flow improving agents such as cellulose, esters and ethers and linear polymers of vinyl acetate, polyvinyl acetate, polyvinyl butyral, hydrogenated castor oil and the like as well as gelling agents from bentonite and montmorillonite. Their compatibility with nitrocellulose is outstandingly good.

In order to determine the compatibility of the polyesters of the invention with sundry combinations of solvents reference is made to the following Table I wherein polyesters which were prepared by heating the indicated mixtures of acids and alcohols in an inert atmosphere of nitrogen to a temperature of about 200 to about 220° C. while removing the water of condensation until the indicated hydroxyl number is obtained, are mixed with the various solvents shown in Table I with the results that are indicated. Where numerals are used to indicate the solubility the indication is in parts per hundred parts of solvent.

TABLE I

| Polyester | 1 | 2 | 3 | 4 | 5 |
|---|---|---|---|---|---|
| 25% solutions with butyl acetate | (³) | (³) | (⁴) | (⁴) | (⁴) |
| Ethylene glycol monoethyl ether acetate/xylene =3:2: | | | | | |
| 50% solutions | (³) | (⁴) | (⁴) | (⁴) | (⁴) |
| 25% solutions | (³) | (⁴) | (⁴) | (⁴) | (⁴) |
| Ethylene glycol monoethyl ether acetate/xylene =1:1: | | | | | |
| 50% solutions | (³) | (⁴) | (⁴) | (⁴) | (⁴) |
| 25% solutions | (³) | (⁴) | (⁴) | (⁴) | (⁴) |
| Ethylene glycol monoethyl ether acetate:butyl acetate:ethyl acetate:toluene=1:1:1:¹): | | | | | |
| 50% solutions | (⁴) | (⁴) | (⁴) | (⁴) | (⁴) |
| 25% solutions | (³) | (⁴) | (⁴) | (⁴) | (⁴) |
| 50% solutions¹ are treated with 10% solutions ⁶ of cellulose acetobutyrate (43% butyric acid) (K-value=50) | <0.005 | 0.04 | 0.04 | 0.04 | 0.04 |
| Polyvinyl butyral | <0.05 | 0.5 | 1.2 | 0.5 | 10.0 |
| Polyvinyl acetate | <0.05 | 0.5 | 0.5 | 0.1 | 0.5 |
| Nitrocellulose | <0.1 | 40.0 | 40.0 | 40.0 | 40.0 |
| Copolymers of vinyl acetate and vinyl chloride | <0.1 | 2.0 | 10.0 | 4.0 | >10.0 |
| 30% solution ¹ was treated with copolymer of vinyl acetate and vinyl chloride | <0.2 | 10.0 | 10.0 | 10.0 | >10.0 |
| 25% solution ¹ was treated with cellulose acetobutyrate (43% butyric acid) (K-value=70) | 1.0 | >10.0 | >10.0 | >10.0 | >10.0 |
| Combination of polyesters 1-5 with alkyd resin ² in the ratio of 1:1: | | | | | |
| 50% solution ⁶ | (⁵) | (⁶) | (⁶) | (⁶) | (⁶) |
| 25% solution ⁶ | (⁵) | (⁶) | (⁶) | (⁶) | (⁶) |

¹ The solution comprises ethylene glycol monoethyl ether acetate:butyl acetate:methyl ethyl ketone:toluene in the proportions of 3:1:3:1.
² Short oil alkyd resin modified with saturated, low molecular weight fatty acid.
³ Insoluble.
⁴ Soluble.
⁵ Incompatible.
⁶ Compatible.

Numbers ⁶ limiting value of compatibility as percentage, based on the quantity of binder.

OH number

Polyester 1 from 3 mols phthalic acid and 3.6 mols trimethylolpropane _____ 290

Polyester 2 from 2 mols phthalic acid, 1 mol hexahydrophthalic acid and 3.6 mols trimethylolpropane _____ 290

Polyester 3 from 1 mol phthalic acid, 2 mols hexahydrophthalic acid and 3.6 mols trimethylolpropane _____ 295

Polyester 4 from 1 mol phthalic acid, 1 mol hexahydrophthalic acid, 1 mol isophthalic acid, and 3.3 mols trimethylolpropane as well as 0.3 mol hexanediol _____ 275

Polyester 5 from 1 mol phthalic acid, 2 mols methylhexahydrophthalic acid, and 3.6 mols trimethylolpropane _____ 285

The preparation of the coating compositions of the invention is preferably carried out by combining the polyesters and any desired additives, such as flow improving agents or the like with a solvent which preferably contains less than about 60 percent aromatic solvents and then adding an organic polyisocyanate in such proportions that the overall —NCO:OH ratio is from about 1.01 to about 1.2 and preferably 1.1 to 1.2 and then the coating is applied to a substrate where the solvent evaporates. The solution may contain pigments such as titanium dioxide, flow improving agents such as polyphenyl methyl siloxane, catalysts, such as zinc octoate, stannous octoate, triethyl amine and the like if any of these additives are necessary or desirable for the particular application.

The polyurethanes prepared according to the invention are useful preferably for coating compositions where resistance to weather, color tone, high permanent gloss and the like are required. For example, for the top coat in painting automobiles, for corrosion resistant industrial coats on metal, wood and the like. They are particularly distinguished by their high abrasion resistance and high resistance to chemicals. The coating compositions of the invention may be employed where air drying or oven drying is desirable.

The invention is further illustrated by the following examples in which parts are given by weight unless otherwise specified.

The isocyanates employed are prepared as follows:

Isocyanate 1.—Sufficient hexamethylene diisocyanate is mixed slowly with water by adding the water to the isocyanate so that a reaction product of 3 mols of the hexamethylene diisocyanate with 1 mol of water is obtained. The initial reaction mixture is heated for about 2 to 3 hours with slow evolution of carbon dioxide at a temperature of about 100° C. Then the temperature of the reaction mixture is increased to from about 130 to about 140° C. for about 4 hours. After filtering to remove the by-product urea polyisocyanates and heating to remove hexamethylene diisocyanate which is unreacted, a biuret triisocyanate product is obtained which corresponds to 3 mols of hexamethylene diisocyanate reacted with 1 mol of water. A 75 percent solution of this product in a mixture of ethylene glycol monoethyl ether acetate and xylene (1:1) and having a NCO content of 17 percent is used.

Isocyanate 2.—About 109.5 parts of adipic acid are introduced into about 1000 parts of hexamethylene diisocyanate at about 150° C. and heated for about three hours, about 66 parts of carbon dioxide being split off. About 1030 parts of the reaction mixture are freed from excess hexamethylene diisocyanate at about 160° C. and about 1.5 mm. Hg in a thin-film evaporator and about 470 parts of a very viscous polyisocyanate are obtained, about a 75 percent solution of which in ethyl glycol monoethyl ether acetate and xylene (1:1) contains about 15 percent of isocyanate groups and shows a dynamic viscosity of about 664 cP/25° C.

Isocyanate 3.—About 336 parts of hexamethylene diisocyanate (hydrolyzable chlorine 0.002%; total chlorine content 0.05%) are treated with 1.2 parts of tri-n-butylphosphine and stirred for about 8 hours at about 50–60° C. The NCO content has then dropped from 49.5% to 35–36%. The reaction is stopped by the addition of about 1.5 parts benzoyl chloride and heating briefly to 80° C. and the low viscosity liquid reaction products is distilled twice over a thin layer evaporator (vacuum 0.3 mm. Hg, circulation temperature of the heating fluid 160–170° C. About 161 parts of distillate and about 170 parts of polymer having an —NCO content of about 20% is obtained.

Using these isocyanates as indicated in the following table and the polyesters disclosed above as indicated after Table I and a solvent mixture of ethylene glycol monoethyl ether acetate, butyl acetate, methyl ethyl ketone and toluene in the proportions of 3:1:3:1 coating compositions were prepared as indicated in the following Table II.

be used for the preparation of the polyurethanes provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A lacquer composition which comprises a solvent solution of a polymer prepared by the process which comprises reacting an aliphatic polyisocyanate with an hydroxyl polyester of an excess of a polyhydric alcohol with a mixture of phthalic acid and hexahydrophthalic acid.

2. The lacquer composition of claim 1 wherein the molar ratio of phthalic acid to hexahydrophthalic acid is in the range of 0.5:2.5 to 2.5:0.5.

TABLE II

|  | 1 | 2 | 3 | 4 | 5 | 6 | 7 | A | B |
|---|---|---|---|---|---|---|---|---|---|
| Polyester 1 | 100 | | | | | | | | |
| Polyester 2 | | 100 | | | | | | | |
| Polyester 3 | | | 100 | | | | 100 | | |
| Polyester 4 | | | | 100 | | 100 | | | |
| Polyester 5 | | | | | 100 | | | | |
| Polyester 6 | | | | | | | | 100 | |
| Epoxide resin | | | | | | | | | 100 |
| Solvent mixture | 310 | 345 | 345 | 320 | 320 | 365 | 400 | 330 | 290 |
| Zinc octoate, 10% in solvent mixture | 4 | 4 | 4 | 4 | 4 | 4 | 4 | 4 | 4 |
| Methylphenylsiloxane, 1% in solvent mixture | 10 | 10 | 10 | 10 | 10 | 10 | 10 | 10 | 10 |
| Titanium dioxide rutile | (96) | (102) | (102) | (98) | (99) | (100) | (108) | (99) | (89) |
| Isocyanate 1 | 124 | 142 | 142 | 128 | 131 | | | 132 | 104 |
| Isocyanate 2 | | | | | | 135 | | | |
| Isocyanate 3 | | | | | | | 115 | | |

The value for titanium dioxide rutile is shown in parentheses to indicate that experiments are carried out with and without pigments which when incorporated is incorporated by trituration. The coatings are applied to steel panels and then subjected to the weatherometer test and to free exposure to weather in the ouside atmosphere. The lacquers prepared according to Examples 1 to 7 show no change in gloss after 2000 hours in the weatherometer. Neither is there any change in color tone or is there any evidence of chalking. This indicates two years possible exposure to the outside elements. Lacquers prepared according to comparison example A begin to chalk and show a marked loss in gloss after only several hundred hours in the weatherometer which indicates that on exposure to the outside atmosphere chalking and loss of gloss begin after only 1½ to 2 years. Lacquers prepared according to comparison example B show marked loss of gloss after 500 hours in the weatherometer. The flow properties of Examples 2 to 7 can be improved with auxiliary agents where the flow properties of the lacquer of Example 1 cannot.

It is to be understood that any other suitable acid or the like could be used in the preparation of the polyesters of the invention provided that the teachings of this disclosure are followed. It is also to be understood that any other suitable aliphatic polyisocyanate, solvent or the like could 3. The lacquer composition of claim 1 wherein the molar ratio of phthalic acid to hexahydrophthalic acid is in the range of 2:1 to 1:2.

4. The lacquer composition of claim 1 wherein the polyhydric alcohol is a dihydric or trihydric alcohol having a molecular weight below about 500.

5. The lacquer composition of claim 1 wherein phthalic acid, isophthalic acid and hexahydrophthalic acid are used in the molar ratio of 1:1:1.

6. The lacquer composition of claim 1 wherein the aliphatic polyisocyanate is a biuret polyisocyanate.

7. The lacquer composition of claim 1 wherein the polyester and the aliphatic polyisocyanate are reacted in an inert organic solvent.

References Cited

UNITED STATES PATENTS 3,124,605   3/1964   Wagner _____ 260—453
3,341,498   9/1967   Skreckoski et al. _____ 260—75
3,392,183   7/1968   Windemuth et al. _____ 260—453

DONALD E. CZAJA, Primary Examiner

H. S. COCKERAM, Assistant Examiner

U.S. Cl. X.R.

260—75, 77.5